United States Patent [19]

Harken et al.

[11] Patent Number: 5,156,378
[45] Date of Patent: Oct. 20, 1992

[54] BEARING BLOCK HAVING HIGH STRENGTH TO WEIGHT RATIO

[75] Inventors: Peter O. Harken, Pewaukee; Dane M. Blackburn, Waukesha, both of Wis.

[73] Assignee: Harken, Inc., Pewaukee, Wis.

[21] Appl. No.: 691,458

[22] Filed: Apr. 25, 1991

[51] Int. Cl.⁵ .................. B66D 3/04; F16C 19/54; F16C 33/76
[52] U.S. Cl. .................. 254/416; 254/415; 384/454; 384/588
[58] Field of Search .............. 254/415, 416, 417, 390; 384/454, 588; 474/112, 198, 199

[56] References Cited
U.S. PATENT DOCUMENTS

| 386,826 | 7/1888 | Howard | 254/417 |
| 1,552,161 | 9/1925 | Houghton | 254/417 |
| 3,368,797 | 2/1968 | Gross | 254/417 |
| 3,804,373 | 4/1974 | Ross | 254/417 X |
| 4,160,541 | 7/1979 | Harken et al. | 254/415 X |

FOREIGN PATENT DOCUMENTS

| 636067 | 9/1936 | Fed. Rep. of Germany | 254/192 |
| 715443 | 2/1980 | U.S.S.R. | 254/417 |

Primary Examiner—Daniel P. Stodola
Assistant Examiner—Michael R. Mansen
Attorney, Agent, or Firm—Juetter Pyle & Lloyd

[57] ABSTRACT

A bearing block having an inner and outer race is provided with an enlarged axial opening through the unloaded portion of the inner race and is selectively reinforced in the region carrying the load, in order to provide an improved strength to weight ratio.

6 Claims, 3 Drawing Sheets

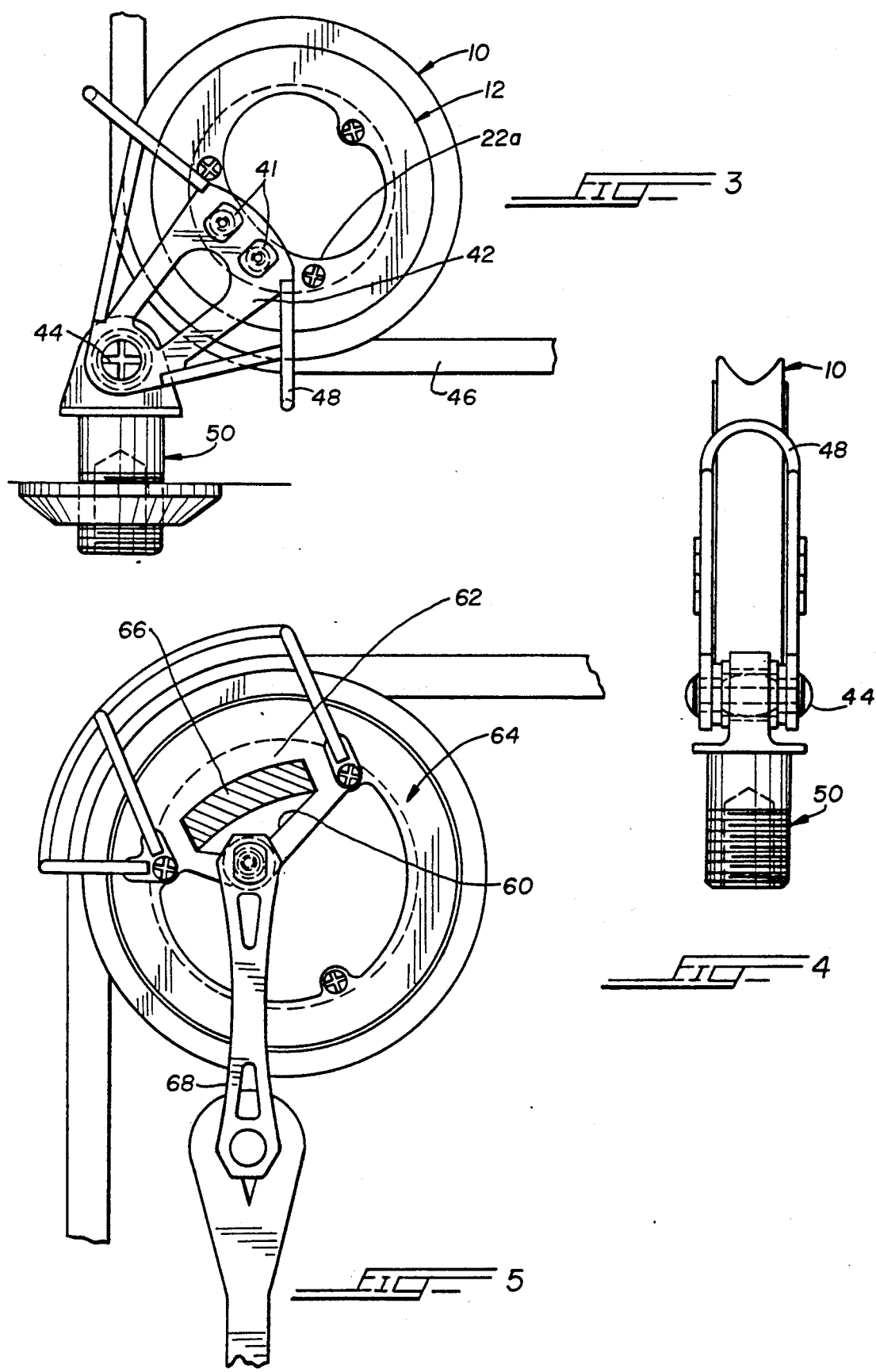

BEARING BLOCK HAVING HIGH STRENGTH TO WEIGHT RATIO

BACKGROUND OF THE INVENTION

This invention relates to bearing blocks or sheaves which are designed primarily for use on sailing vessels.

Modern sailing vessels use a variety of bearing blocks or rotatable sheaves to control lines or cables attached to the sails and various parts of the rigging. A bearing block comprises a line-receiving sheave rotatably mounted between a pair of side plates, with the side plates being attached to the vessel or rigging by means of a shackle or other attachment means. The term "sheave" is also generally used to denote the combination of an outer annular rotating member having a line receiving groove, and an inner circular fixed plate member, with bearings between the inner and outer members.

With the increased technical sophistication of racing sailboats, the total weight and bulk of the fittings mounted on the boat become an important consideration. Weight of fittings at or above the deckline contribute to healing momentum, and bulky fittings increase windage. Thus, it is desirable to provide fittings, such as bearing blocks and sheaves, which have a minimal surface area and profile, as well as a high strength to weight ratio.

It is common practice in the case of bearing blocks and sheaves to provide a plurality of openings therein to reduce total weight. A point is reached, however, where the size or total area of the openings reduce the working strength of the fitting.

SUMMARY OF THE INVENTION

The present invention comprises a sheave having an outer line receiving a groove in an outer bearing race, and an inner bearing race, with a plurality of bearings between the outer and inner races. Means are provided for anchoring the inner race in a fixed rotary position relative to the outer race, such that the outer race may rotate as it carries a line.

The present invention is based on the premise that virtually all of the load on the bearings of a sheave occurs at the limited region where the line engages, or is tangent to, the line receiving groove. Since the inner race is rotationally fixed, the same region of the inner race continuously bears the load from the bearing, and the remaining parts of the sheave remain relatively unloaded.

In order to minimize weight, the diameter of the inner race is maximized and is provided with an enlarged opening or openings, with the opening being in the order of greater than 20 to 30 percent of the circular area defined by the inner race. In order to provide maximum strength, the inner race is selectively reinforced in the fixed loaded region where the line is engaged by the outer race. In other words, the inner race is annular in form, with a substantially thicker wall section in the load bearing region or section. This allows the construction of a sheave having a working load to weight ratio of in excess of one thousand.

The anchoring means for the inner race may comprise conventional side plates which are secured to the reinforced portion of the inner race and extend beyond the outer race for attachment to a post or other fitting or support in a conventional fashion.

THE DRAWINGS

FIG. 3 is a side view of the sheave shown in FIG. 1 together with anchoring means for the sheave.

FIG. 4 is an end view of the embodiment shown in FIG. 3.

FIG. 5 is a side view of a sheave of modified configuration used as a becket block.

DESCRIPTION OF THE PREFERRED EMBODIMENTS

Figure 1:
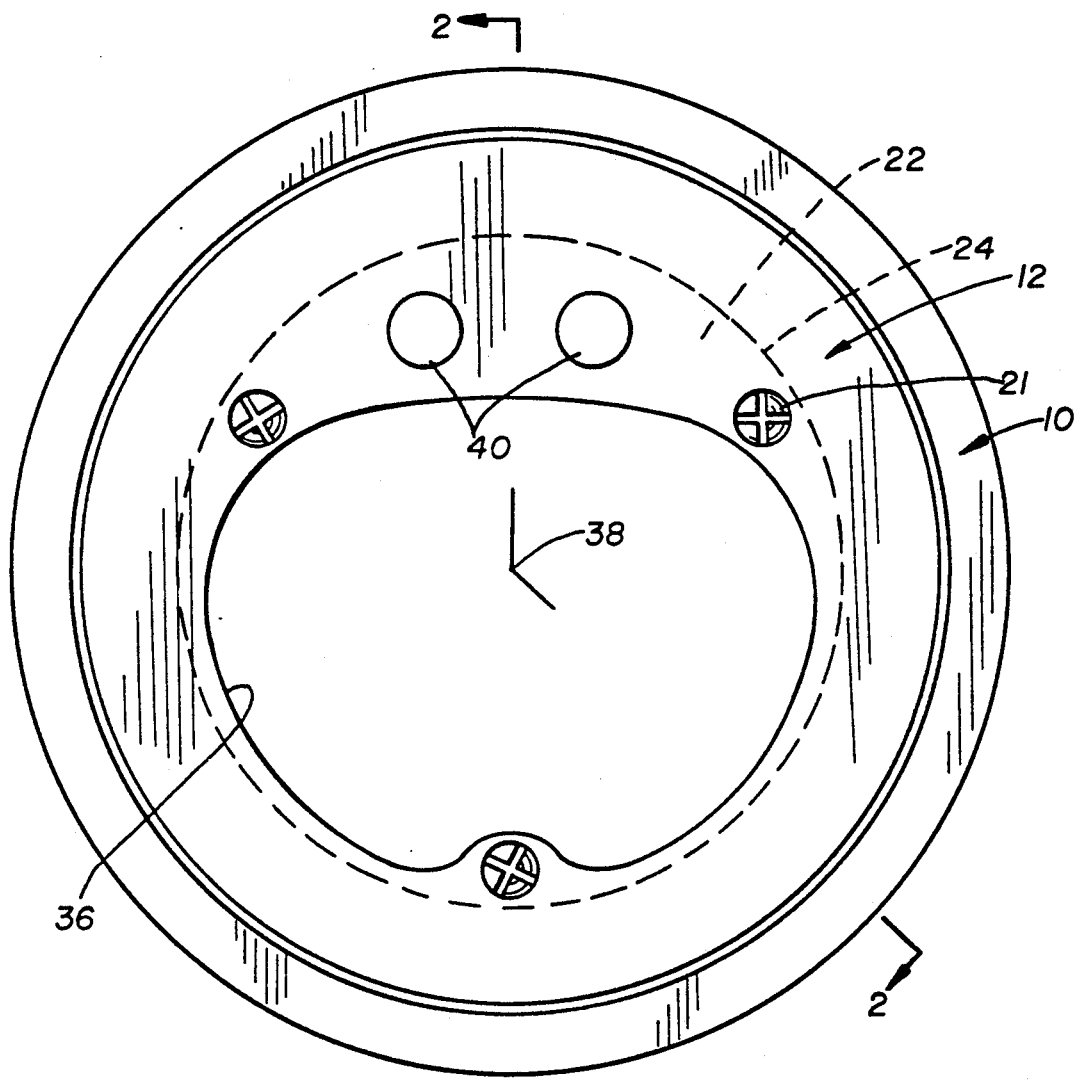
FIG. 1 is a plan view of the sheave of the present invention.
Figure 2:
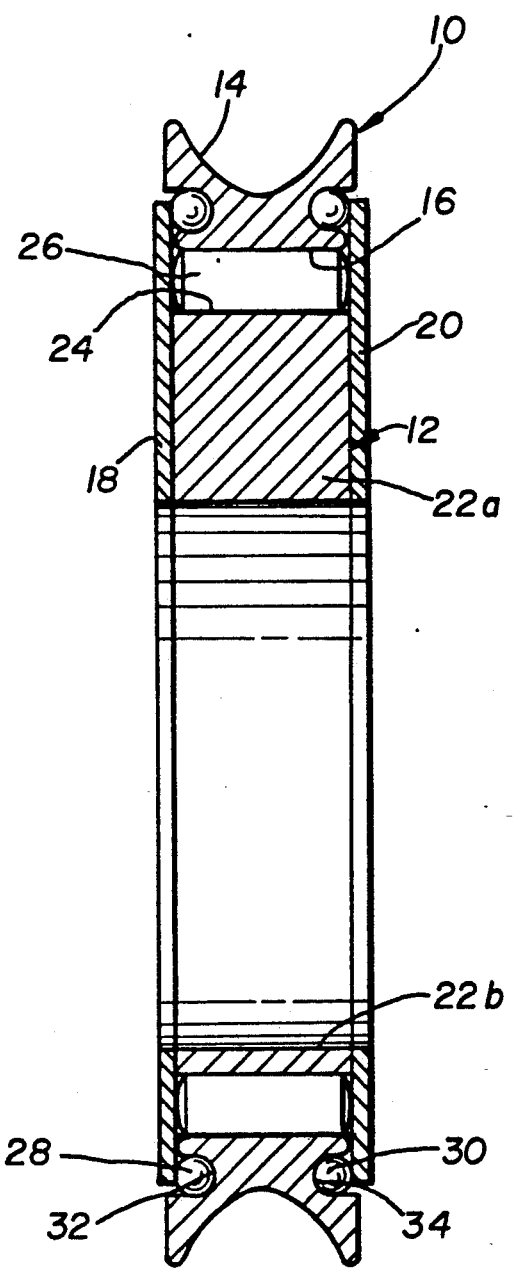
FIG. 2 is a sectional view along line 2—2 of FIG. 1.

FIGS. 1 and 2 illustrate the sheave of the present invention, which generally comprises an outer race 10 rotatable about an inner race 12. The outer race 10 comprises an outwardly facing, line receiving groove 14 and a first inwardly facing cylindrical bearing surface 16. The inner race comprises a pair of outer annular plates 18 and 20 secured by threaded fasteners 21 to a central annular member 22 having a second cylindrical and outwardly facing radial bearing surface 24.

As shown, a plurality of contiguous roller bearings 26 in the shape of cylinders are disposed in a continuous fashion between the first and second bearing surfaces 16 and 24. The outer plates 18 and 20 extend beyond the diameter of the bearing surface 24 and contain the ends of the roller bearings 26. In addition, sets of ball bearings 28 and 30 may be disposed between the sides of the outer race 10 and the respective plates 18 and 20 and are preferably carried in circular grooves 32 and 34 in the sides of the outer race and bear on the side plates a shown. The roller bearings 26 carry the primary rolling or radial loads exerted between the inner and outer races. The ball bearing sets 28 and 30 assist in carrying side loads and prevent the rotating outer race from rubbing against the plates. This bearing arrangement is generally conventional and is shown and described, for example, on page 40 of the 1990 edition of "Harken Yacht Equipment" catalog, published by Harken, Inc.

In accordance with the present invention, the annular member 22 and circular plates 18 and 20 are provided with an enlarged opening 36 in a central region thereof, said opening being greater than twenty percent of the circular area around the central axis 38 of the bearing surface of the annulus 22. As shown, the opening 36 is generally oval in shape.

In addition, one quadrant, or slightly more than one quadrant of the annulus 22, is reinforced substantially more than in the other quadrants, and preferably this is accomplished by increasing the wall thickness in such quadrant. It may be seen, for example, that the thickness of the wall of the annulus 22 indicated at 22a in FIG. 2 is in the order of five to ten times the thickness of the portions 22b in other quadrants. The reinforced quadrant 22a is located in the region of maximum axial stress on the sheave, as will be more fully described.

One or more spaced openings 40 may be provided in the reinforced portion 22a of the annulus 22 to hold the inner race 12 in a fixed position relative to rotation of the outer race 10 around the central axis 38, as shown in FIGS. 3 and 4.

As shown in FIGS. 3 and 4, the reinforced region or portion 22a of the inner race may be secured by bolts 41 to a pair of side plates 42 which extend beyond the outer perimeter of the sheave, with the outer ends of the plates being attached to a common member, such as a rotary connection to a pivot pin 44. A control line 46 is partially wrapped around the groove of the outer race 10 as shown, and it will be seen that the maximum load carried by the sheave is exerted along a line through the axis of the pivot pin 44 and through and between the openings 40 or bolts 41 in the reinforced quadrant of the inner race. As the outer race rotates, the bearings continue to circulate into the loaded region, such that any wear on the bearings is substantially uniform.

As shown, the block may include bail members 48 secured between the side plates and extending across the outer perimeter of the sheave to prevent disengagement of a slack line. The pivot pin 44 may be connected to a fitting 50 to enable securement to the deck of the boat or other attachment point. Other types of conventional securement fittings may be employed.

FIG. 4 illustrates another embodiment in the form of a becket block in which a secondary opening 60 is provided in the reinforced portion 62 of the inner race 64. A strap 66 may be passed through the secondary opening 60 and may extend upwardly for securement to a support, such as the boom. A downwardly extending support arm 68 may be employed to additionally stabilize the block, as shown.

We claim:

1. A bearing block having a high strength to weight ratio, wherein the bearing block comprises an outer circular race having a groove for receiving a flexible line, a fixed circular inner race, and bearing means between said inner and outer races to enable rotation of said outer race around the inner race and a central axis, the improvement wherein said inner race has an enlarged opening therethrough having an area greater than twenty percent of the area of the inner race, said line being received on said outer race around a zone which is fixed relative to the fixed inner race, a reinforced area offset from said control axis corresponding to and selectively supporting said zone, with the enlarged opening being adjacent thereto, said reinforced area comprising a solid wall having a radial thickness substantially greater than the axial thickness of the remaining portion of said inner race, and means through said reinforced area for connecting said inner race to a support, whereby loads exerted by the line on the bearing block are supported by said reinforced area.

2. The bearing block of claim 1 wherein the bearing means comprise recirculating rotary bearings.

3. The bearing block of claim 1 wherein an opening is provided in said solid wall for receiving a support.

4. The bearing block of claim 1 additionally comprising a pair of said plates secured to and extending from said reinforced area beyond the perimeter of said outer race and in opposition to said zone, and support means for supporting the outer ends of said side plates.

5. The bearing block of claim 1 wherein said inner race comprises an annular member having an axially outwardly facing cylindrical bearing surface, and a pair of annular side plate members secured to said annular member and extending beyond the perimeter of said cylindrical surface.

6. The bearing block of claim 5 wherein said outer race comprises an annular member having an axially inwardly facing cylindrical bearing surface, and a plurality of cylindrical roller bearings radially uniformly disposed between said bearing surfaces.

* * * * *